United States Patent
Abt et al.

(10) Patent No.: US 12,084,573 B2
(45) Date of Patent: Sep. 10, 2024

(54) POLYAMIDE MOLDING COMPOUND WITH LOW DIELECTRIC LOSS FACTOR

(71) Applicant: EMS-CHEMIE AG, Domat/Ems (CH)

(72) Inventors: Doris Abt, Chur (CH); Georg Stoeppelmann, Bonaduz (CH); Botho Hoffmann, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 219 days.

(21) Appl. No.: 17/348,481

(22) Filed: Jun. 15, 2021

(65) Prior Publication Data

US 2021/0395517 A1    Dec. 23, 2021

(30) Foreign Application Priority Data

Jun. 22, 2020 (CH) .................... 00744/20

(51) Int. Cl.
| | |
|---|---|
| *C08L 71/12* | (2006.01) |
| *C08K 3/40* | (2006.01) |
| *C08K 7/14* | (2006.01) |

(52) U.S. Cl.
CPC .............. *C08L 71/123* (2013.01); *C08K 3/40* (2013.01); *C08K 7/14* (2013.01); *C08L 71/12* (2013.01); *C08L 2205/025* (2013.01); *C08L 2205/035* (2013.01)

(58) Field of Classification Search
CPC ................... C08L 71/12; C08L 77/00
See application file for complete search history.

(56) References Cited

U.S. PATENT DOCUMENTS

| | | | | |
|---|---|---|---|---|
| 9,512,301 | B2 * | 12/2016 | Nakagawa | ............... C08L 77/02 |
| 10,174,180 | B2 * | 1/2019 | Bao | ..................... B29C 45/0005 |
| 2003/0054936 | A1 * | 3/2003 | Tamura | ................... C03C 3/091 |
| | | | | 501/35 |
| 2009/0062452 | A1 * | 3/2009 | Harder | ................... C08G 69/36 |
| | | | | 264/165 |
| 2015/0175804 | A1 * | 6/2015 | Aepli | ..................... C08K 5/5313 |
| | | | | 524/100 |
| 2016/0355679 | A1 | 12/2016 | Aepli | |
| 2020/0032010 | A1 | 1/2020 | Liao | |
| 2021/0130583 | A1 * | 5/2021 | Jiang | ......................... C08K 7/14 |

FOREIGN PATENT DOCUMENTS

| | | | | |
|---|---|---|---|---|
| CN | 106133060 | A * | 11/2016 | ............... B29B 7/48 |
| CN | 108794998 | A * | 11/2018 | ....... B29C 45/14311 |
| JP | 2016000802 | A * | 1/2016 | ............. C08J 3/226 |
| WO | 2019105815 | A1 | 6/2019 | |
| WO | 2020008300 | A1 | 1/2020 | |

OTHER PUBLICATIONS

Machine translation of CN 108794998 (2018, 9 pages).*
Machine translation of CN 106133060 (2016, 8 pages).*
CPIC (HL-Glass Fibers, 2022 1 page).*
Machine translation of JP 2016-000802 (2016, 11 pages).*
Search Report issued by the European Patent Office in connection with application No. CH 7442020 dated Jun. 22, 2020.

* cited by examiner

*Primary Examiner* — Brieann R Johnston

(74) *Attorney, Agent, or Firm* — Dennemeyer & Associates LLC

(57) ABSTRACT

The present invention relates to a thermoplastic molding composition comprising:

A mixture of at least one polyamide A1, at least one polyphenylene ether A2 and optionally a compatibilizer A3 and optionally an olefinic and/or vinylaromatic polymer A4;

B 10 to 60% by weight of glass filler, the glass composition of which comprises at least 10% by weight of boron oxide and at most 15% by weight for the sum of magnesium oxide and calcium oxide;

C 1 to 8% by weight of LDS additive;

D 0 to 5% by weight of additives other than components A, B and C;

wherein 80 to 100% by weight of mixture A consists of a mixture M of components A1, A2 and A3 and 0 to 20% by weight of component A4, in each case based on the sum of components M and A4, and wherein the sum of components M and A4 gives 100% by weight of mixture A, and wherein 36 to 92% by weight of mixture M is of component A2, from 8 to 60% by weight of component A1 and from 0 to 4% by weight of component A3, based in each case on the sum of components A1 to A3, and the sum of components A1 to A3 being 100% by weight of the mixture M, and the sum of components A to D being 100% by weight of the molding composition.

9 Claims, No Drawings

POLYAMIDE MOLDING COMPOUND WITH LOW DIELECTRIC LOSS FACTOR

CROSS-REFERENCE TO RELATED APPLICATIONS

This application claims benefit to Swiss application no. 00744/20, filed Jun. 20, 2020, which is hereby incorporated by reference in its entirety.

TECHNICAL FIELD

The present invention relates to glass fiber-reinforced thermoplastic molding compositions based on polyamides and polyphenylene ethers with low relative permittivity and low dielectric loss factor, as well as moldings made from these molding compositions and uses thereof. The molding compounds also contain an LDS additive, and moldings made from them can be selectively metallized after partial irradiation.

STATE OF THE ART

Plastic molding compositions with low relative permittivity and low dielectric loss factor are advantageously used in the manufacture of housings, housing parts or other components of devices communicating via electromagnetic waves with a frequency of 0.3 to 300 GHz, since their use can avoid significant impairment of the transmission and reception properties of these devices.

Devices communicating via such electromagnetic waves are used in various areas, for example in telecommunications, consumer electronics or in the home, in particular transmitting and receiving devices, cell phones, tablets, laptops, navigation devices, surveillance cameras, photo cameras, sensors, dive computers, audio systems, remote controls, loudspeakers, headphones, radios, televisions, kitchen appliances, door or gate openers, control units for the central locking system of vehicles, keyless go vehicle keys, temperature measuring and display devices, measuring devices and control units.

The polyamide molding compositions described in EP 3 330 319 A1 are said to have a relative permittivity of not more than 3.5 at a frequency of 2.45 GHz. In addition to a specific mixture of aliphatic and amorphous or microcrystalline polyamides, the molding compounds contain a glass filler consisting of glass with a content of alkali oxides and alkaline earth oxides of 0 to 12% by weight, as well as additives. All worked examples and comparative examples have a relative permittivity of greater than 3.2, regardless of composition. No information is provided with regard to the dielectric loss factor and the metallizability.

EP 3 560 987 A1 describes a glass fiber reinforced molding composition with high tensile strength and impact strength in combination with low dielectric constant and low dielectric loss factor. The molding compound contains 10 to 90% by weight of glass fibers and 90 to 10% by weight of a plastic, the glass fiber composition being specified in more detail. Compared to E-glass, the described glass fiber contains significantly less alkaline earth oxides but a higher content of boron oxide, reducing the dielectric constant to 4.8 and the dielectric loss factor to 0.0015, each determined at 10 GHz. As the disclosed examples show, the improved dielectric properties can also be applied to polyamide molding compounds. However, for a molding compound of PA6 and 50 wt % glass fibers, a relative permittivity of 3.39 and a dielectric loss factor of 0.0109 at best are determined. No information is given on the metallizability of the molding compounds.

EP 2 291 444 describes laser direct structurable (LDS) molding compounds with a high dielectric constant of at least 4 and a low dielectric loss factor of at most 0.01. The molding compounds contain a base resin, an LDS additive and a ceramic filler with a dielectric constant ≥25. In the examples, molding compounds based on polyamides and polyphenylene ethers are shown that have a DK in the range of 4.1 to 6.8. However, the dielectric loss factor of the molding compounds described in the examples is not disclosed.

OBJECT OF THE INVENTION

Based on this, one task of the present invention was to provide thermoplastic molding compositions which, in addition to a low relative permittivity of less than 3.0 and a low dielectric loss factor of less than 0.008, can also be processed well by injection molding and, in particular, exhibit good injection shrinkage and warpage/distortion behavior. Furthermore, the thermoplastic molding compositions should have good mechanical properties, preferably the molding compositions should have a breaking stress of at least 70 MPa and a tensile modulus of at least 4000 MPa. In addition, the molding compounds should have good metallizability after partial laser irradiation.

This task is solved by the thermoplastic molding compounds according to claim 1, which consist of the following components:
- (A) mixture of at least one polyamide (A1), at least one polyphenylene ether (A2) and optionally a compatibilizer (A3) and optionally an olefinic and/or vinylaromatic polymer (A4);
- (B) 0 to 60% by weight of glass filler, the glass composition of which comprises at least 10.0% by weight of boron oxide and at most 15% by weight for the sum of magnesium oxide and calcium oxide;
- (C) 1 to 8% by weight LDS additive;
- (D) 0 to 5% by weight of additives other than components (A), (B) and (C);

where the mixture (A) comprises from 80 to 100% by weight of a mixture (M) of components (A1), (A2) and (A3) and from 0 to 20% by weight of component (A4), in each case based on the sum of components (M) and (A4), and where the sum of components (M) and (A4) gives 100% by weight of the mixture (A);

and wherein the mixture (M) consists of 36 to 92% by weight of component (A2), 8 to 60% by weight of component (A1) and 0 to 4% by weight of component (A3), in each case based on the sum of components (A1) to (A3), and wherein the sum of components (A1) to (A3) gives 100% by weight of the mixture (M);

and wherein the sum of components (A) to (D) gives 100% by weight of the molding composition.

Dependent claims 2 to 12 relate to advantageous embodiments of the thermoplastic molding compositions according to the invention. In addition, according to claim 13, moldings are provided from the thermoplastic molding composition according to the invention, and claims 14 and 15 relate to special moldings.

With regard to the composition of the mixture (A), it follows from the above that components (A1) to (A3) together account for 80 to 100% by weight of the mixture (A) and the content of component (A4) in the mixture (A) is 0 to 20% by weight. The mixture of components (A1), (A2)

and (A3) is referred to as component (M). Apart from components (A1) to (A4), mixture (A) does not contain any other components.

The thermoplastic molding composition according to the invention, as well as moldings made therefrom, have a relative permittivity of less than 3.0 and a dielectric loss factor (DLF) of less than 0.008. Here, the measurement of relative permittivity and DLF is performed according to IEC 61189-2-721 (2015) on 80×80×3 mm plates using a split post dielectric resonator (SPDR) from QWED, Poland at a measurement frequency of 2.45 GHz and a temperature of 23° C.

By good mechanical properties, it is understood that the molding compound according to the invention has a tensile modulus of at least 4000 MPa, preferably of at least 5000 MPa, and/or a breaking stress of at least 70 MPa, preferably of at least 75 MPa, and/or an elongation at break of at least 1.5%, preferably of at least 1.8%. Here, the tensile modulus, the breaking stress and the breaking elongation are determined according to ISO 527 (2012).

In the sense of the invention, well metallizable means that moldings (plate 60×60×2 mm) injection-molded from the thermoplastic molding compound according to the invention can be sufficiently metallized in the copper-plating bath after partial irradiation with an Nd:YAG laser (FOBA DP50 laser, wavelength=1064 nm, irradiation width=50 μm, speed=4 m/s). For this purpose, 16 adjacent 10×10 mm areas are irradiated on the molded part surface during laser structuring, whereby both the pulse frequency (5, 6, 7 and 8 kHz) and the current intensity (24 to 25.5 Amp) of the laser are varied. The cleaned moldings are then metallized in a reductive copper plating bath (MacDermid MID-Copper 100 B1) for 20-30 minutes.

Sufficiently metallized here now means that copper is deposited in at least 14 areas with an average thickness of at least 3 μm.

DESCRIPTION OF THE INVENTION

Surprisingly, it was found that the task described above is solved by a thermoplastic molding composition consisting of:
- (A) mixture of at least one polyamide (A1), at least one polyphenylene ether (A2) and optionally a compatibilizer (A3) and optionally an olefinic and/or vinylaromatic polymer (A4);
- (B) 10 to 60% by weight of glass filler, the glass composition of which comprises at least 10.0% by weight of boron oxide and at most 15% by weight for the sum of magnesium oxide and calcium oxide;
- (C) 1 to 8 wt. % LDS additive other than components (A), (B) and (C);
- (D) 0 to 5% by weight of additives;

wherein the mixture (A) consists of 80 to 100% by weight of a mixture (M) of components (A1), (A2) and (A3) and 0 to 20% by weight of component (A4), in each case based on the sum of components (M) and (A4), and wherein the sum of components (M) and (A4) gives 100% by weight of the mixture (A);

and wherein the mixture (M) consists of 36 to 92% by weight of component (A2), 8 to 60% by weight of component (A1) and 0 to 4% by weight of component (A3), in each case based on the sum of components (A1) to (A3), and wherein the sum of components (A1) to (A3) gives 100% by weight of the mixture (M);

and wherein the sum of components (A) to (D) gives 100% by weight of the molding composition.

The content of mixture (A) in the molding composition is obtained as the difference between the sum of contents (B) to (D) and 100% by weight of the total molding composition.

Preferably, mixture (A) is present in the molding composition in a proportion of from 34 to 82.9% by weight, particularly preferably from 39 to 78.8% by weight, based on the total weight of the molding composition (sum A to D).

The proportion of component (B) is preferably in the range from 15 to 55% by weight, particularly preferably in the range from 18 to 52% by weight, based in each case on the sum of (A) to (D).

The proportion of component (C) is preferably in the range from 2 to 6% by weight, particularly preferably in the range from 3 to 5% by weight, based in each case on the sum of (A) to (D).

The proportion of component (D) is preferably in the range from 0.1 to 5% by weight, particularly preferably in the range from 0.2 to 4% by weight, in each case based on the sum of (A) to (D).

As the investigations that were carried out show, molding compounds reinforced with glass fibers, the polymer matrix of which consists exclusively of polyamides, have too high a relative permittivity and too high a dielectric loss factor, even when so-called "low DK glass fibers" are used as reinforcing fibers. In contrast, molding compounds with a matrix of polyphenylene ethers exhibit too high warpage/distortion, in particular too high shrinkage values, and are processed much more poorly. A molding composition whose polymeric portion is formed by a 1:1 blend of polyamide and polyphenylene ether and which is reinforced with glass fibers consisting of E-glass also exhibits excessive permittivity and dielectric loss, especially in the presence of an LDS additive with a high relative permittivity.

DEFINITIONS OF TERMS

For the purposes of the present invention, the term "polyamide" (abbreviation PA) is understood as a generic term encompassing homopolyamides and copolyamides. The chosen spellings and abbreviations for polyamides and their monomers correspond to those specified in ISO standard 16396-1 (2015(D)). The abbreviations used therein are used in the following as synonyms to the IUPAC names of the monomers; in particular, the following abbreviations for monomers occur: T or TPS for terephthalic acid, I or IPS for isophthalic acid, MACM for bis(4-amino-3-methyl-cyclohexyl)methane (also referred to as 3,3'-dimethyl-4,4'-diaminodicyclohexylmethane, CAS no. 6864-37-5), PACM for bis(4-amino-cyclohexyl)methane (also referred to as 4,4'-diaminodicyclohexylmethane, CAS No. 1761-71-3), TMDC for bis(4-amino-3,5-dimethyl-cyclohexyl)methane (also referred to as 3,3',5,5'-tetramethyl-4,4'-diaminodicyclohexylmethane, CAS No. 65962-45-0). For 1,6-hexanediamine (also referred to as hexamethylenediamine), the abbreviation HMDA is used.

Compared to the semi-crystalline polyamides, amorphous polyamides exhibit no or only a very low, hardly detectable heat of fusion. In dynamic differential scanning calorimetry (DSC) according to ISO 11357 (2013) at a heating rate of 20 K/min, the amorphous polyamides preferably exhibit a heat of fusion of less than 5 J/g, particularly preferably of not more than 3 J/g, most preferably of 0 to 1 J/g. Amorphous polyamides do not have a melting point due to their amorphous nature.

Microcrystalline polyamides have a melting point in addition to a glass transition temperature. However, they have a morphology in which the crystallites have such a small dimension that a sheet made from them with a thickness of 2 mm is still transparent, i.e., its light transmission is at least 90% and its haze at most 3%, measured according to ASTM D 1003-13 (2013). In differential scanning calorimetry (DSC) according to ISO 11357 (2013), microcrystalline polyamides preferably exhibit a heat of fusion of 5 to 25 J/g at a heating rate of 20 K/min, particularly preferably of 5 to 22 J/g, and most preferably of 5 to 20 J/g.

In addition to a glass transition temperature, semi-crystalline polyamides have a distinct melting point and preferably exhibit a heat of fusion of more than 25 J/g, particularly preferably of more than 30 J/g, most preferably of 30 to 80 J/g, in dynamic differential scanning calorimetry (DSC) according to ISO 11357 (2013) at a heating rate of 20 K/min.

Relative Permittivity and Dielectric Loss Factor

Permittivity ($\varepsilon$) is an indicator of the behavior of molecules when placed in an electric field. It is related to the relative permittivity ($\varepsilon_r$) and the permittivity of the vacuum ($\varepsilon_0$) via the relationship $\varepsilon = \varepsilon_r \cdot \varepsilon_0$. The relative permittivity ($\varepsilon_r$) represents a substance-dependent quantity and is the quotient of the permittivity ($\varepsilon$) and the permittivity of the vacuum ($\varepsilon_0$). In addition to the type of substance, the relative permittivity ($\varepsilon_r$) also depends on the frequency of the electric field and the temperature.

The dielectric loss factor indicates how great the losses are in electrical components such as capacitors, or in the propagation of electromagnetic waves in matter, e.g. plastic molding compounds. Loss here means the energy that is converted electrically or electromagnetically and dissipated as heat, for example. The electromagnetic wave is attenuated by these losses. For a more precise representation of the loss factor, a capacitor is considered which is connected to a voltage source with a sinusoidal voltage curve over time. A phase shift $\varphi$ between voltage and current occurs across such a capacitor. An ideal capacitor, which has no losses, has a phase shift of $\varphi=90°$ For a real, lossy capacitor, the phase shift is less than 90° by the loss angle $\delta$, and the dielectric loss factor (DLF) is equal to tan $\delta$. Accordingly, the dielectric loss factor is a measure of the amount of energy an insulating material absorbs in the alternating field and converts into heat loss. Materials with a high dissipation factor are not suitable as insulating or housing materials in high-frequency applications. Relative permittivity and dielectric loss factor are preferably determined according to IEC 61189-2-721 (2015).

Component (A)

The thermoplastic molding composition according to the invention comprises as polymer component a mixture (A) consisting of at least one polyamide (A1), at least one polyphenylene ether (A2) and optionally a compatibilizer (A3) and optionally an olefinic and/or vinylaromatic polymer (A4).

In this case, the mixture (A) consists of 80 to 100% by weight of a mixture (M) of components (A1) to (A3) and 0 to 20% by weight of component (A4), in each case based on the sum of components (M) and (A4), the sum of components (M) and (A4) being 100% by weight of the mixture (A).

The mixture (M) consists of 36 to 92% by weight of component (A2), 8 to 60% by weight of component (A1), 0 to 4% by weight of component (A3), in each case based on the sum of components (A1) to (A3).

Preferably, component (A1) is present in the mixture (M) in a proportion of from 10 to 48% by weight, particularly preferably from 10 to 45% by weight, based on the sum of (A1) to (A3).

Preferably, component (A2) is present in the mixture (M) in a proportion of from 48 to 89.9 percent by weight, particularly preferably from 52 to 89.8 percent by weight, based on the sum (A1) to (A3).

Preferably, component (A3) is present in the mixture (M) in a proportion of from 0.1 to 4 percent by weight, particularly preferably from 0.2 to 3 percent by weight, based on the sum (A1) to (A3).

Preferably, component (A4) is present in the mixture (A) in a proportion of 0 to 20 percent by weight, based on the sum (M) and (A4), particularly preferably the mixture (A) is free of component (A4). I.e. the mixture (A) particularly preferably consists exclusively of components (A1) to (A3).

Component (A1)

One embodiment of the present invention provides that aliphatic polyamides are preferred as component (A1). In particular, aliphatic polyamides selected from the group consisting of PA 46, PA 6, PA 66, PA 6/66, PA 10, PA 11, PA 12, PA 516, PA 610, PA 612, PA 614, PA 616, PA 618, PA 1010, PA 1012, PA 1014, PA 1016, PA 1018, PA 1212 and mixtures thereof are preferred. Aliphatic polyamides with an N/C ratio (N=nitrogen/C=carbon) of greater than or equal to 8 are particularly preferred, since these polyamides have lower water absorption and thus the dielectric properties change less in a humid environment. In particular, the aliphatic polyamides PA 610, PA 612, PA 1010, PA12 and PA 616 are preferred.

According to a further embodiment of the present invention, amorphous or microcrystalline polyamides are preferred as components (A1). In particular, amorphous or microcrystalline polyamides are preferably selected from the group consisting of PA 6I/6T, PA MACM9, PA MACM10, PA MACM12, PA MACM13, PA MACM14, PA MACM16, PA MACM17, PA MACM18, PA PACM10, PA PACM12, PA PACM13, PA PACM14, PA PACM16, PA PACM17, PA PACM18, PA TMDC10, PA TMDC12, PA TMDC13, PA TMDC14, PA TMDC16, PA TMDC17, PA TMDC18, PA MACM10/10, PA MACMI/12, PA MACMT/12, PA 6I/MACMI/MACMT, PA MACMI/MACMT/12, PA MACMI/MACMT/MACM12, PA MACMI/MACMT/MACM12/12, PA 6I/6T/MACMI/MACMT/12, PA 6I/6T/MACMI, PA MACMI/MACM36, PA MACMT/MACM36, PA MACMI/MACM12, PA MACMT/MACM12, PA MACM6/11 PA MACM10/10, PA MACM12/PACM12, PA MACM14/PACM14, PA MACM18/PACM18, and mixtures thereof, wherein PA 6I/6T, PA MACM12, PA MACM14, PA TMDC12, PA TMDC14, PA MACMI/12, PA 6I/6T/MACMI/MACMT, PA MACMI/MACMT/12, PA MACMI/MACMT/MACM12, PA 6I/6T/MACMI/MACMT/12, PA MACM10/10, PA MACM12/PACM12, PA MACM14/PACM14, PA MACM18/PACM18, and mixtures thereof. Most preferred are PA 6I/6T, PA MACM12, PA MACMI/12, PA MACMI/MACMT/12, PA MACMI/MACMT/MACM12, PA MACM12/PACM12 and blends thereof.

According to a further preferred embodiment, semi-crystalline, partially aromatic polyamides are preferred as component (A1). The semicrystalline, partially aromatic polyamides preferably have a glass transition temperature in the range from 90 to 150° C., preferably in the range from 110 to 140° C. and in particular in the range from 115 to 135° C. The melting point of the semicrystalline, partially aromatic polyamides is in the range of 255 to 330° C., preferably in the range of 270 to 325° C. and in particular in the range of 280 to 320° C. Preferably, the semicrystalline, partially aromatic polyamides of component (A1) have enthalpies of fusion determined by DSC according to ISO 11357 (2013) in the range from 25 to 80 J/g, preferably in the range from 30 to 70 J/g.

Preferred partially aromatic, partially crystalline polyamides are made from
- (a): dicarboxylic acids: from 30 to 100 mol %, in particular from 50 to 100 mol %, of terephthalic acid and from 0 to 70 mol %, in particular from 0 to 50 mol %, of at least one aliphatic dicarboxylic acid having 6 to 16 carbon atoms, and/or from 0 to 70 mol %, in particular from 0 to 50 mol %, of at least one cycloaliphatic dicarboxylic acid having 8 to 20 carbon atoms, and/or from 0 to 50 mol % of isophthalic acid, based in each case on the total amount of dicarboxylic acids,
- (b): diamines: 80 to 100 mol % of at least one aliphatic diamine having 4 to 18 carbon atoms, preferably having 6 to 12 carbon atoms, and 0 to 20 mol % of at least one cycloaliphatic diamine, preferably having 6 to 20 carbon atoms, such as PACM, MACM, IPDA and/or 0 to 20 mol % of at least one araliphatic diamine, such as MXDA and PXDA, based on the total amount of diamines, and optionally
- (c): aminocarboxylic acids and/or lactams: each having 6 to 12 carbon atoms.

According to a preferred embodiment, the semicrystalline, partially aromatic polyamide of component (A1) is formed on the basis of at least 55 mol %, in particular at least 65 mol %, of terephthalic acid and at least 80 mol %, preferably at least 90 mol %, in particular at least 95 mol %, of aliphatic diamines having 4 to 18 carbon atoms, preferably having 6-12 carbon atoms, and optionally further aliphatic, cycloaliphatic and aromatic dicarboxylic acids and also lactams and/or aminocarboxylic acids.

According to a further preferred embodiment, said e.g. aliphatic dicarboxylic acids of the partially aromatic polyamide of component (A1), which can be used in addition to terephthalic acid, are selected from the group consisting of adipic acid, succinic acid, azelaic acid, sebacic acid, undecanedioic acid, dodecanedioic acid, brassylic acid, tetradecanedioic acid, pentadecanedioic acid, hexadecanedioic acid, octadecanedioic acid and dimer fatty acid (36 C atoms). Adipic acid, sebacic acid and dodecanedioic acid are particularly preferred. Accordingly, dicarboxylic acids that are preferably used in addition to terephthalic acid are isophthalic acid, adipic acid, sebacic acid and dodecanedioic acid or a mixture of such dicarboxylic acids. In particular, polyamides (A1) based exclusively on terephthalic acid as a dicarboxylic acid are preferred.

According to a further preferred embodiment, said aliphatic diamines of the partially aromatic polyamide of component (A1) are selected from the group consisting of 1,4-butanediamine, 1,5-pentanediamine, 1,6-hexanediamine, 1,7-heptanediamine, 1,8-octanediamine, 1,9-nonanediamine, methyl-1, 8-octanediamine, 1,10-decanediamine, 1,11-undecanediamine, 1,12-dodecanediamine, or a mixture of such diamines, wherein 1,6-hexanediamine, 1,10-decanediamine, 1,12-dodecanediamine, or a mixture of such diamines is preferred, and wherein 1,6-hexanediamine and 1,10-decanediamine are particularly preferred. In addition to the aliphatic diamines, cycloaliphatic and/or araliphatic diamines may be substituted in a concentration of 0 to 20 mol %, based on the total amount of diamines Further preferably, the polyamides (A1) are formed from the following components:
- (a): dicarboxylic acids: 50 to 100 mol % terephthalic acid, 0 to 50 mol % of an aliphatic dicarboxylic acid, preferably having 6 to 12 carbon atoms, and/or a cycloaliphatic dicarboxylic acid, preferably having 8 to 20 carbon atoms, and/or isophthalic acid, in each case based on the total amount of dicarboxylic acids present;
- (b): diamines: 80 to 100 mole % of at least one aliphatic diamine with 4 to 18 carbon atoms, preferably with 6 to 12 carbon atoms, based on the total content of diamines present; 0 to 20 mole % of cycloaliphatic diamines, preferably with 6 to 20 carbon atoms, such as. e.g. PACM, MACM, IPDA and/or araliphatic diamines, such as MXDA and PXDA, wherein in the high-melting polyamides the percent molar content of dicarboxylic acids is 100% and the percent molar content of diamines is 100%, and optionally:
- (c): aminocarboxylic acids and/or lactams containing lactams with preferably 6 to 12 carbon atoms, and/or aminocarboxylic acids with preferably 6 to 12 carbon atoms.

While components (a) and (b) are preferably used largely in equimolar proportions, the concentration of (c) is preferably at most 30% by weight, preferably at most 20% by weight, in particular at most 15% by weight, in each case based on the sum of (a) to (c).

Suitable cycloaliphatic dicarboxylic acids are cis- and/or trans-cyclohexane-1,4-dicarboxylic acid and/or cis- and/or trans-cyclohexane-1,3-dicarboxylic acid (CHDA). The aliphatic diamines mentioned above, which are generally used, can be replaced by other diamines in minor amounts of not more than 20 mol %, of preferably not more than 15 mol % and in particular not more than 10 mol %, based on the total amount of diamines. As cycloaliphatic diamines, for example, cyclohexanediamine, 1,3-bis-(aminomethyl)-cyclohexane (BAC), isophoronediamine (IPDA), norbornanedimethylamine, 4, 4'-diaminodicyclohexylmethane (PACM), 2,2-(4,4'-diaminodicyclohexyl)propane (PACP), and 3,3'-dimethyl-4,4'-diaminodicyclohexylmethane (MACM) can be used. As araliphatic diamines, m-xylylenediamine (MXDA) and p-xylylenediamine (PXDA) should be mentioned.

In addition to the dicarboxylic acids and diamines described, lactams and/or aminocarboxylic acids can also be used as polyamide-forming components (component (c)). Suitable compounds are, for example, caprolactam (CL), α,ω-aminocaproic acid, α,ω-aminononanoic acid, α,ω-aminoundecanoic acid (AUA), laurolactam (LL) and α,ω-aminododecanoic acid (ADA). The concentration of the aminocarboxylic acids and/or lactams used together with components (A1_a) and (A1_b) is at most 20% by weight, preferably at most 15% by weight and particularly preferably at most 12% by weight, based on the sum of components (A1a) to (A1c). Lactams or α,ω-amino acids with 4, 6, 7, 8, 11 or 12 C atoms are particularly preferred. These are the lactams pyrrolidin-2-one (4 C atoms), ε-caprolactam (6 C atoms), oenanthlactam (7 C atoms), capryllactam (8 C atoms), laurinlactam (12 C atoms), resp. the α,ω-amino acids 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid, respectively. In a particularly preferred embodiment, component (A1) is free of caprolactam or aminocaproic acid or free of any aminocarboxylic acid or lactam.

Regulators in the form of monocarboxylic acids or monoamines may be added to the batch and/or the precondensate (prior to post-condensation) to control the molecular weight, relative viscosity or flowability, or MVR. Suitable aliphatic, cycloaliphatic or aromatic monocarboxylic acids or monoamines as regulators are acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3, 5-di-tert-butyl-4-ydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)-propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol, and others. The regulators can be used individually or in combination. Other monofunctional compounds that can react with an amino or acid group, such as anhydrides, isocyanates, acid halides or esters, can also be used as regulators. The usual amount of regulators used is between 10 and 200 mmol per kg of polymer.

Specific representatives for the semi-crystalline partially aromatic polyamides (A1) are: PA 4T/4I, PA 4T/6I, PA 5T/5I, PA 6T/6, PA 6T/6I, PA 6T/6I/6, PA 6T/66, 6T/610, 6T/612, PA 6T/10T, PA 6T/10I, PA 9T, PA 10T, PA 12T, PA 10T/10I, PA10T/106, PA10T/610, PA10T/612, PA10T/66, PA10T/6, PA10T/1010, PA10T/1012, PA10T/12, PA10T/11, PA 6T/9T, PA 6T/12T, PA 6T/10T/6I, PA 6T/6I/6, PA 6T/6I/12 and mixtures thereof, in particular preferably the partially aromatic polyamide of component (A1) is selected from the group: PA 6T/6I, PA 6T/10T, PA 6T/10T/6I, as well as mixtures thereof. Polyamides (A1) containing 6T units, in particular at least 10% by weight of 6T units, are preferred.

According to the invention, the following partially aromatic copolyamides are therefore particularly preferred as polyamides (A1):
  semicrystalline polyamide 6T/6I with 55 to 75 mol % hexamethylene terephthalamide units and 25 to 45 mol % hexamethylene isophthalamide units;
  semicrystalline polyamide 6T/6I with 62 to 73 mol % hexamethylene terephthalamide units and 25 to 38 mol % hexamethylene isophthalamide units;
  semicrystalline polyamide prepared from at least 50 mol % of terephthalic acid and at most 50 mol % of isophthalic acid, in particular from 100 mol % of terephalic acid, and a mixture of at least two diamines selected from the group consisting of hexamethylenediamine, nonandiamine, methyloctanediamine and decanediamine;
  semi-crystalline polyamide prepared from 70-100 mol % terephthalic acid and 0-30 mol % isophthalic acid and a mixture of hexamethylenediamine and dodecanediamine;
  semi-crystalline polyamide prepared from at least 50 mol % terephthalic acid and not more than 50 mol % dodecanedioic acid and a mixture of at least two diamines selected from the group consisting of hexamethylenediamine, nonandiamine, methyloctanediamine and decanediamine;
  semicrystalline polyamide 6T/10T with 10 to 60 mol %, preferably 10 to 40 mol % hexamethylene terephthalamide (6T) units and 40 to 90 mol %, preferably 60 to 90 mol % decamethylene terephthalamide (10T) units;
  semi-crystalline polyamide 6T/10T/6I with 50 to 90 mol %, preferably 50-70 mol % hexamethylene terephthalamide (6T) units, and 5 to 45 mol %, preferably 10-30 mol % hexamethylene isophthalamide (6I) units and 5 to 45 mol %, preferably 20-40 mol % decamethylene terephthalamide (10T) units;

The polyamides (A1) have a solution viscosity $\eta_{rel}$, measured according to ISO 307 (2007) on solutions of 0.5 g of polymer in 100 ml of m-cresol at a temperature of 20° C., preferably in the range from 1.3 to 2.7, particularly preferably in the range from 1.4 to 2.3 and especially preferably in the range from 1.5 to 2.0.

Component (A2)

The polyphenylene ethers used according to the invention are known as such. They are prepared by conventional methods from phenols disubstituted in the ortho-position by alkyl groups by oxidative coupling (see U.S. Pat. Nos. 3,661,848, 3,378,505, 3,306,874, 3,306,875 and 3,639,656). Catalysts based on heavy metals such as copper, manganese or cobalt in combination with other substances such as secondary amines, tertiary amines, halogens or combinations thereof are commonly used for the preparation.

Suitable polyphenylene ethers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1, 4-phenylene) ether, poly(2,6-dipropyl-1,4-phenylene) ether, poly(2-ethyl-6-propyl-1,4-phenylene) ether or copolymers, such as those containing 2,3,6-trimethylphenol, and blends thereof. Preferred is poly(2,6-dimethyl-1,4-phenylene)ether optionally in combination with 2,3,6-trimethylphenol units. The polyphenylene ethers can be used in the form of homopolymers, copolymers, graft copolymers, block copolymers or ionomers.

Suitable polyphenylene ethers generally have an intrinsic viscosity preferably in the range of 0.1 to 0.6 dl/g, measured in chloroform at 25° C. This corresponds to a molecular weight Mn (number average) of 3,000 to 40,000 g/mol and a weight average molecular weight Mw of 5,000 to 80,000 g/mol. It is possible to use a combination of a high viscosity and a low viscosity polyphenylene ether. The ratio of the two differently viscous polyphenylene ethers depends on the viscosities and the desired physical properties.

To improve the compatibility between component (A1) and component (A2), in a preferred embodiment the polyphenylene ethers used are modified in such a way that they preferably contain carbonyl, carboxyl, carboxylic acid, acid anhydride, acid amide, acid imide, carboxylic acid ester, carboxylate, amino, hydroxyl, epoxy, oxazoline, urethane, urea, lactam or halobenzyl groups covalently bonded. Preferably, the unmodified polyphenylene ethers (A2) are modified for this purpose with α,β-unsaturated dicarbonyl compounds, amide groups or lactam group-containing monomers with a polymerizable double bond (A3) optionally in combination with radical starters (A3), such as peroxides, in particular dibenzoyl peroxide, as described for example in EP 0 654 505 A1.

Component (A3)

For improved compatibility of components (A1) and (A2), compatibilizers can be used in the form of functional compounds that interact with the polyphenylene ether, the polyamide, or both. The interaction may be chemical (e.g., by grafting) and/or physical (e.g., by affecting the surface properties of the dispersed phase).

In a preferred embodiment of the invention, the compatibilizer additionally comprises a radical initiator, which is preferably an organic peroxide or an azo compound. That is, in this embodiment, the compatibilizer is graft-polymerized in the presence of a free radical initiator.

In a particularly preferred embodiment, the compatibilizer is used without a free radical initiator.

The compatibilizers can be functional compounds containing at least one carboxylic acid, carboxylic acid anhydride, epoxy, ester, amide or imide group, preferably in combination with olefinic double bonds. Examples include maleic acid, maleic anhydride, fumaric acid, acrylic acid, methacrylic acid, methylmaleic acid, methylmaleic anhydride, itaconic acid, itaconic anhydride, butenylsuccinic acid, butenylsuccinic anhydride, tetrahydrophthalic acid, tetrahydrophthalic anhydride N-phenylmaleimide, citric acid, malic acid and 2-hydroxynonadecane-1,2,3-tricarboxylic acid, the mono- or diesters of the acids mentioned with C1- to C12-alcohols such as methanol or ethanol, the mono- or diamides of the acids mentioned, which may be substituted on the nitrogen with alkyl or aryl radicals having up to 12 carbon atoms, and the salts with alkali or alkaline earth metals such as calcium and potassium. Particularly preferred are maleic acid, fumaric acid, maleic anhydride and citric acid. The compatibilizer can be added alone or in combination with an optional radical initiator either directly during blend preparation, or the polyphenylene ether and/or the polyamide are functionalized by the compatibilizers in a separate step.

Suitable radical starters are, for example, 1,1-di-tert-butyl-peroxy-3,3,5-trimethylcyclohexane, tert-butyl-peroxy-isopropyl-carbonate, tert-butyl-peroxy-3,3,5-trimethylhexoate, tert-butyl-peracetate, tert-butyl-perbenzoate, 4,4-di-tert-butyl-peroxy-valeric acid n-butyl ester, 2,2-di-tert-butyl-peroxy-butane, dicumyl peroxide, tert-butyl-cumyl peroxide, 1,3-bis(tert-butyl-peroxyisopropyl)benzene, di-tert-butyl peroxide and azoisobutyronitrile. Preferred as a radical initiator is an organic peroxide, particularly preferred is dicumyl peroxide.

Accordingly, component (A3) comprises a compatibilizer or a mixture of compatibilizer and radical initiator. Compatibilizer and radical initiator are present in a total amount of 0 to 4% by weight, preferably of 0.1 to 4% by weight and particularly preferably in a range of 0.2 to 3% by weight, based on the sum (A1) to (A3). The radical initiator is preferably present in a range from 0 to 1 wt. %, particularly preferably in a range from 0.05 to 0.8 wt. %, based on the sum (A1) to (A3).

In a preferred embodiment, the compatibilizer is graft-polymerized without addition of a free radical initiator, i.e. component (A3) is preferably free of free radical initiator.

Component (A4)

The blends (A) according to the invention may contain, in addition to the polyamide (A1), the polyphenylene ether (A2) and the optional compatibilizer (A3), from 0 to 20% by weight of vinylaromatic and/or olefinic polymers (A4).

The olefinic polymer is a homo- or co-polyolefin, in particular preferably a polymer based on ethylene, propylene and butylene or copolymers thereof and copolymers with other α-olefinic monomers, in particular 1-pentene, 1-hexene, 1-heptene, 1-octene and 1-decene.

The vinylaromatic polymer is preferably polystyrene or copolymers of styrene with other monomers that have at least one olefinic double bond, such as the α-olefins ethylene, propylene and butylene or acrylic acid or acrylic acid esters or butadiene. Particularly preferred are block copolymers having at least one block formed from vinylaromatic monomers (block-A) and at least one block formed from olefinic monomers (block-B), such as are present in styrenic block copolymers.

The olefinic and/or vinyl aromatic polymers used as component (A4) may be or may contain a natural rubber, polybutadiene, polyisoprene, polyisobutylene, a copolymer of butadiene and/or isoprene with styrene or styrene derivatives and other comonomers, a hydrogenated copolymer and/or a copolymer formed by grafting or copolymerization with acid anhydrides, (meth)acrylic acid and esters thereof. The polymers (A4) may also be a graft rubber with a crosslinked elastomeric core consisting of butadiene, isoprene or alkyl acrylates and having a graft shell of polystyrene, a non-polar or polar olefin homo- and copolymer such as ethylene-propylene-, ethylene-propylene-diene and ethylene-octene or ethylene-vinyl acteate rubber, or a non-polar or polar olefin homo- and copolymer formed by grafting or copolymerization with acid anhydrides, (meth)acrylic acid and esters thereof. The polymers (A4) can also be a carboxylic acid-functionalized copolymer such as poly(ethene-co-(meth)acrylic acid) or poly(ethene-co-1-olefin-co-(meth) acrylic acid), where the 1-olefin is an alkene or an unsaturated (meth)acrylic acid ester having more than 4 atoms, including those copolymers in which the acid groups are partially neutralized with metal ions.

Component (A4) is advantageously selected from the group consisting of polystyrene, polybutadiene-polystyrene graft copolymer, styrene-ethylene-butylene-styrene block copolymers (SEBS), styrene-ethylene-propylene-styrene block copolymers (SEPS), Styrene-butadiene-styrene block copolymers (SBS), styrene-styrene-butadiene-styrene block copolymers (SSBS), ethylene/propylene copolymers, ethylene/propylene/diene copolymers (EPDM), polyethylene (PE), polypropylene (PP), polybutadiene (PB), Poly-4-methylpentene, ethylene-propylene copolymers, ethylene-butene copolymer, ethylene-methylhexadiene copolymers, propylene-methylhexadiene copolymers, ethylene-octene copolymer, ethylene-propylene-butene copolymers, ethylene-propylene-hexene copolymers, ethylene-propylene-methylhexadiene copolymers, poly(ethylene-vinyl acetate) (EVA), ethylene-ethyl acrylate copolymer (EEA), ethylene-hexene copolymer, ethylene-propylene-diene terpolymers, and blends of these polymer materials. Particularly preferably, these polymers (A4) are grafted with acrylic acid, methacrylic acid or maleic anhydride, the degree of grafting being 0.1 to 4.0 percent by weight based on the grafted polymer (A4).

It is further preferred that the mixture (A) contains as component (A4) at least one vinylaromatic polymer and optionally at least one polyolefin. It is particularly preferred if the mixture (A) contains at least 5 percent by weight, in particular at least 10 percent by weight, in each case based on the total amount of (A), of a vinylaromatic polymer.

Preferably, the olefinic and/or vinylaromatic polymers (A4) are selected from the group consisting of styrene-ethylene-butylene-styrene block copolymers (SEBS), styrene-ethylene-propylene-styrene block copolymers (SEPS), Styrene-butadiene-styrene block copolymers (SBS), Styrene-styrene-butadiene-styrene block copolymers (SSBS), Polyethylene (PE), Polypropylene (PP), Polybutadiene (PB), Poly-4-methylpentene, Ethylene-propylene copolymers, Ethylene-butene copolymer, ethylene-methylhexadiene copolymers, propylene-methylhexadiene copolymers, ethylene-octene copolymer, ethylene-propylene-butene copolymers, ethylene-propylene-hexene copolymers, ethylene-propylene-methylhexadiene copolymers, poly(ethylene-vinyl acetate) (EVA), ethylene-ethyl acrylate copolymer (EEA), ethylene-hexene copolymer, ethylene-propylene-diene terpolymers, and blends of these polymer materials.

Furthermore, it is preferred if the olefinic and/or vinylaromatic polymers (A4) of the molding composition are grafted with carboxylic acid or carboxylic acid anhydride groups, the grafting having been carried out particularly preferably with acrylic acid, methacrylic acid or maleic anhydride and/or the degree of grafting being preferably 0.1 to 4.0 percent by weight, particularly preferably 0.4 to 2.5 percent by weight and especially preferably 0.5 to 2.0 percent by weight, in each case based on the grafted polymer (A4).

Component (B) is a filler based on glass, which is present in 10 to 60% by weight in the polyamide molding compound. The fillers can be in fibrous or particulate form, individually or as a mixture. Component (B) may thus contain fibrous fillers (reinforcing agents) or particulate fillers or a mixture of reinforcing agents and particulate fillers. For the purposes of the invention, the terms glass-based filler or glass filler are used synonymously.

According to the invention, a glass filler (B) based on glass is used, the glass composition of which comprises at least 10% by weight of boron oxide and at most 15% by weight for the sum of magnesium oxide and calcium oxide, based on the composition of the glass.

According to a preferred embodiment of the present invention, the glass filler is based on glass whose glass composition comprises 2 to 14 wt %, more preferably 4 to 12 wt % for the sum of the magnesium oxide and calcium oxide contents, based on the composition of the glass.

According to another preferred embodiment of the present invention, the glass filler is based on glass, the glass composition of which comprises 12 to 24 wt %, particularly preferably 15 to 22 wt %, of boron oxide, based on the composition of the glass.

The glass filler is preferably selected from the group consisting of fibers, ground fibers, particles, flakes, spheres, hollow spheres and mixtures thereof, particularly preferably consisting of fibers, particles, flakes and mixtures thereof. More particularly preferably, the glass filler is a glass fiber. Most particularly preferably, component (B) is a glass fiber having a non-circular cross-section and an axial ratio of major to minor cross-sectional axis in the range of from 2 to 6, more preferably from 3 to 5.

The glass filler may be surface treated. This can be done with a suitable sizing or adhesion promoter system. For example, systems based on fatty acids, waxes, silanes, titanates, polyamides, urethanes, polyurethanes, polyhydroxyethers, epoxides, nickel or combinations or mixtures thereof can be used for this purpose. Preferably, the glass filler is surface treated with aminosilanes, epoxysilanes, polyamides or mixtures thereof.

If fibers are selected as the glass filler for component (B), then the glass fibers are preferably selected from the group consisting of chopped fibers, continuous fibers and mixtures thereof, wherein the fibers may have a circular or non-circular cross-section. The non-circular or non-circular glass fibers are also referred to as flat glass fibers and may have an oval, elliptical, angular, rectangular or near-rectangular cross-sectional area.

The chopped glass fibers preferably have a fiber length of from 1 to 25 mm, preferably from 1.5 to 20 mm, more preferably from 2 to 12 mm, and most preferably from 2 to 8 mm.

The chopped glass fibers preferably have a diameter of from 5 to 20 µm, preferably from 5 to 15 µm and particularly preferably from 6 to 12 µm.

If the glass fibers are used as continuous fibers (roving), they preferably have a diameter of at most 20 µm, preferably of at most 18 µm, particularly preferably of 5 to 17 µm.

In the case of flat glass fibers, the aspect ratio, i.e. the ratio of the main cross-sectional axis to the minor cross-sectional axis, is 2 to 8, preferably 2 to 6, particularly preferably 3 to 5. The cross-sectional axes of the flat glass fibers are 3 to 40 µm long. Preferably, the length of the minor cross-sectional axis is 3 to 20 µm, more preferably 4 to 10 µm, and the length of the major cross-sectional axis is 6 to 40 µm, more preferably 12 to 30 µm.

Blends of fibers with circular (round) and non-circular (flat) cross-sections can also be used to reinforce the polyamide molding compounds of the invention.

If glass beads or glass particles are selected as the glass filler (B), their mean volumetric diameter (D50) is preferably 0.3 to 100 µm, particularly preferably 5 to 80 µm and especially preferably 17 to 70 µm, measured by laser diffraction according to ASTM B 822-10 (2010).

Furthermore, the glass filler has a relative permittivity of preferably at most 7, particularly preferably at most 5, and a dielectric loss factor of preferably at most 0.0040 and particularly preferably at most 0.0030, determined using a glass plate (80×80×3 mm) made of the glass of the glass filler according to IEC 61189-2-721 (2015) with a split post dielectric resonator (SPDR) from QWED, Poland at a frequency of 2.45 GHz and a temperature of 23° C.

According to a preferred embodiment of the present invention, component (B) is present in the polyamide molding composition in an amount of preferably 15 to 55% by weight, particularly preferably 18 to 52% by weight, these amounts referring to the sum of components (A) to (D).

According to a preferred embodiment of the present invention, component (B) consists exclusively of a glass filler selected from the group consisting of glass fibers, ground glass fibers, glass particles, glass flakes, glass beads, hollow glass beads or combinations of the foregoing, the glass filler consisting of glass in which the sum of the magnesium oxide and calcium oxide contents is in the range from 2 to 14% by weight and the boron oxide ($B_2O_3$) content is in the range from 12 to 24% by weight, in each case based on the composition of the glass. Particularly preferably, the glass filler is formed entirely from glass fibers.

In a particularly preferred embodiment, component (B) is selected as a glass filler, in particular preferably as a glass fiber, the glass of which comprises the following composition: 52.0 to 57.0 wt. % silicon dioxide, 13.0 to 17.0% by weight aluminum oxide, 15.0 to 22.0% by weight boron oxide, 2.0 to 6.0% by weight magnesium oxide, 2.0 to 6.0% by weight calcium oxide, 1.0 to 4.0% by weight titanium dioxide, 0 to 1.5% by weight fluorine, 0 to 0.6% by weight alkali oxides.

Preferably, the proportion of component (C) is in the range from 2 to 6% by weight, preferably in the range from 3 to 5% by weight, in each case based on the molding compound (sum of components (A) to (D)).

Component (C) is preferably an LDS additive with a non-zero absorption coefficient for UV, VIS or IR radiation, which forms metal nuclei under the action of electromagnetic radiation, preferably as laser radiation, said metal nuclei facilitating and/or enabling and/or improving the deposition of metal layers in a chemical metallization process for the production of conductor tracks at the irradiated points on the molding surface. The LDS additive preferably has an absorption capacity in the visible and infrared radiation range with an absorption coefficient of at least 0.05, preferably at least 0.1 and in particular at least 0.2, and/or is provided with an absorber which transfers the radiation energy to the LDS additive.

Component (C) is preferably an LDS additive with a median particle size (D50) in the range of 50-10000 nanometers, preferably 200 to 5000 nanometers and particularly preferably 300 to 4000 nanometers, and/or an aspect ratio of at most 10, particularly at most 5. The D50 value, given as a measure of the particle size, is a measure of the median particle size, with 50 volume percent of the sample being finer and the other 50% of the sample being coarser than the D50 value (median).

Preferably, component (C) is an LDS (Laser Direct Structuring) additive selected from the group of metal oxides, in particular so-called spinels with the general chemical formula $AB_2O_4$, where A is a metal cation with valence 2 and B is a metal cation with valence 3. The metal cation A is preferably selected from the group consisting of magnesium, copper, cobalt, zinc, tin, iron, manganese and nickel, and combinations thereof, and the metal cation B is preferably selected from the group consisting of manganese, nickel, copper, cobalt, tin, titanium, iron, aluminum and chromium, and combinations thereof.

In particular, the LDS additive is preferably a copper iron spinel, a copper-containing magnesium aluminum oxide, a copper-chromium-manganese mixed oxide, a copper-manganese-iron mixed oxide, optionally each with oxygen vacancies, or salts and oxides of copper, such as in particular copper(I) oxide, copper(II) oxide, basic copper phosphates, copper sulfate, as well as metal complex compounds, in particular chelate complexes of copper, tin, nickel, cobalt, silver and palladium or mixtures of such systems, and/or in particular selected from the following group: copper-chromium-manganese mixed oxides, copper-manganese-iron mixed oxides, copper chromium oxide, copper tungstate, zinc iron oxide, cobalt chromium oxide, cobalt aluminum oxide, magnesium aluminum oxide, as well as mixtures and/or surface-treated and/or oxygen-defective forms thereof. Possible systems are, for example, those described in WO-A-2000/35259 or in *Kunststoffe* 92 (2002) 11, pp 2-7.

Also preferred as component (C) is an LDS (Laser Direct Structuring) additive selected from the group of metal oxides, mixed metal oxides, metal hydroxide oxides, metal sulfide oxides based on tin. Particularly preferred is tin oxide and doped tin oxide, where the doping can be with antimony, bismuth, molybdenum, aluminum, titanium, silicon, iron, copper, silver, palladium and cobalt. In particular, tin oxide doped with antimony, titanium or copper is preferred. Furthermore, mixtures of tin oxide and at least one further metal oxide, in particular antimony oxide, are preferred as LDS additives. As further metal oxides, both colorless highly refractive metal oxides, such as in particular titanium dioxide, antimony(III) oxide, zinc oxide, tin oxide and/or zirconium dioxide are used, as well as colored metal oxides, such as chromium oxide, nickel oxide, copper oxide, cobalt oxide and in particular iron oxide ($Fe_2O_3$, $Fe_3O_4$). In particular, the mixture of tin oxide and antimony(III) oxide is preferred.

Preferably, the doped tin oxides or metal oxide mixtures or tin oxide are formed as layers on platelet-shaped substrates, in particular layered silicates, such as synthetic or natural mica, talc, kaolin, glass platelets or silicon dioxide platelets. Mica or mica flakes are particularly preferred as substrates for the metal oxides. Furthermore, platelet-shaped metal oxides such as platelet-shaped iron oxide, aluminum oxide, titanium dioxide, silicon dioxide, LCP's (Liquid Crystal Polymers), holographic pigments or coated graphite platelets are also considered as substrates.

Particularly preferred are LDS additives based on mica, where the mica surface is coated with metal-doped tin oxides. In particular, antimony-doped tin oxide is preferred. Examples of commercially available LDS additives according to the present invention are: Lazerflair LS820, LS825, LS830 and Minatec 230 A-IR from Merck, Stanostat CP40W, Stanostat CP15G or Stanostat CP5C from Keeling & Walker, Fabulase 322S, 330, 350 and 352 from Budenheim.

The particularly preferred LDS additives are copper chromite, copper tungstate, copper hydroxide phosphate and antimony-doped tin oxide, the latter being preferably used in combination with mica. Copper tungstate is quite particularly preferred.

The thermoplastic molding composition according to the invention contains 0 to 5% by weight of at least one additive as component (D), which is different from components (A), (B) and (C).

According to a preferred embodiment, the molding composition according to the invention contains 0.1 to 5% by weight and preferably 0.2 to 4% by weight, based on the sum of components (A) to (D), of at least one additive as component (D).

According to a preferred embodiment, the additives of components (D) are selected from the group consisting of stabilizers, antioxidants, antiozonants, processing stabilizers, processing aids, viscosity modifiers, light stabilizers, UV stabilizers, UV absorbers, inorganic heat stabilizers, in particular based on copper halides and alkali halides, organic heat stabilizers, optical brighteners, crystallization accelerators, crystallization retarders, flow aids, lubricants, slip agents, mold release agents, coloring agents, in particular dyes, inorganic pigments, organic pigments, marking agents and mixtures thereof.

According to a particularly preferred embodiment, the molding composition according to the invention contains as component (D) at least one processing aid, the latter preferably being present in a proportion of 0 to 2% by weight, in particular preferably of 0.1 to 2.0% by weight, especially preferably of 0.1 to 1.5% by weight and most preferably of 0.2 to 1.0% by weight, in each case based on the total weight of components (A) to (D). Preferred metal salts are Al, alkali metal, alkaline earth metal salts, esters or amides of fatty acids containing 10 to 44 carbon atoms and preferably 14 to 44 carbon atoms, the metal ions Na, Mg, Ca and Al being preferred and Ca or Mg being particularly preferred. Particularly preferred metal salts are magnesium stearate, calcium stearate and calcium montanate as well as aluminum stearate. The fatty acids may be mono- or divalent. Examples include pelargonic acid, palmitic acid, lauric acid, margaric acid, dodecanedioic acid, behenic acid and the particularly preferred stearic acid, capric acid and montanic acid (mixture of fatty acids with 30 to 40 carbon atoms).

According to a further preferred embodiment, the molding composition according to the invention contains at least one heat stabilizer as component (D), this preferably being present in a proportion of 0 to 3% by weight, in particular preferably of 0.1 to 2.0% by weight, in each case based on the total weight of components (A) to (D).

According to a preferred embodiment, the heat stabilizers are selected from the group consisting of:

Compounds of monovalent or divalent copper, e.g. salts of monovalent or divalent copper with inorganic or organic acids or monovalent or divalent phenols, the oxides of monovalent or divalent copper, or the complex compounds of copper salts with ammonia, amines, amides, lactams, cyanides or phosphines, preferably Cu(I) or Cu(II) salts of hydrohalic acids, hydrocyanic acids or the copper salts of aliphatic carboxylic acids. Particularly preferred are the monovalent copper compounds CuCl, CuBr, CuI, CuCN and $Cu_2O$, and the divalent copper compounds $CuCl_2$, $CuSO_4$, CuO, copper(II) acetate or copper(II) stearate. Advantageously, the copper compounds are used in combination with further metal halides, in particular alkali halides, such as NaI, KI, NaBr, KBr, the molar ratio of metal halide to copper halide being 0.5 to 20, preferably 1 to 10 and particularly preferably 3 to 7

Stabilizers based on secondary aromatic amines, these stabilizers preferably being present in an amount of 0.1 to 2, preferably 0.2 to 0.5% by weight stabilizers based on sterically hindered phenols, these stabilizers preferably being present in an amount of from 0.1 to 1.5, preferably from 0.2 to 0.6% by weight, and phosphites and phosphonites, and mixtures of the above stabilizers.

Examples of stabilizers based on secondary aromatic amines which can be used according to the invention are adducts of phenylenediamine with acetone (Naugard A), adducts of phenylenediamine with linols, Naugard 445, N,N'-dinaphthyl-p-phenylenediamine, N-phenyl-N'-cyclohexyl-p-phenylenediamine or mixtures thereof.

Suitable sterically hindered phenols are in principle all compounds with a phenolic structure that have at least one sterically demanding group on the phenolic ring. Preferred examples of stabilizers based on sterically hindered phenols that can be used according to the invention are N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid) glycol ester, 2,1'-thioethylbis-(3-(3,5-di tert-butyl-4-hydroxyphenyl)-propionate, 4-4'-butylidene-bis-(3-methyl-6-tert-butylphenol), triethylene glycol-3-(3-tert-butyl-4-hydroxy-5-methylphenyl)-propionate, or mixtures of two or more of these stabilizers.

Preferred phosphites and phosphonites are triphenylphosphite, diphenylalkylphosphite, phenyldialkylphosphite, tris (nonylphenyl)phosphite, trilaurylphosphite, trioctadecylphosphite, distearylphentaerythritol diphosphite, tris (2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, diisodecyloxypentaerythritol diphosphite, bis(2, 4-di-tert-butyl-6-methylphenyl)pentaerythritol diphosphite, bis(2,4,6-tris-(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8, 10-tetra-tert-butyl-12H-dibenz-[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methylphosphite and bis(2,4-di-tert-butyl-6-methylphenyl)ethylphosphite. In particular, tris[2-tert-butyl-4-thio(2'-methyl-4'-hydroxy-5'-tert-butyl)-phenyl-5-methyl]phenyl phosphite and tris(2,4-di-tert-butylphenyl)phosphite (Irgafos 168) are preferred.

A preferred embodiment of the heat stabilizer is the combination of organic heat stabilizers, in particular Irgafos 168 and Irganox 1010 or HOSTANOX O 3 P (bis[3,3-bis-(4'hydroxy-3'-tert-butyl-phenyl) butanoic acid glycol ester) and SANDOSTAB P-EPQ (tetrakis(2,4-di-tert-butylphenyl)-4,4'-biphenyldiphosphonite). In particular, heat stabilization based solely on CuI and KI is preferred.

Examples of oxidation retarders and heat stabilizers include phosphites and other amines (e.g. triacetone diamine), hydroquinones, various substituted representatives of these groups and mixtures thereof in concentrations up to 1% by weight, based on the weight of components (A) to (D).

Various substituted resorcinols, salicylates, benzotriazoles, -triazines and benzophenones are mentioned as UV stabilizers, which are generally used in amounts of up to 2% by weight, based on the weight of the molding composition.

Inorganic pigments, such as titanium dioxide, ultramarine blue, iron oxide and carbon black and/or graphite, furthermore organic pigments, such as phthalocyanines, quinacridones, perylenes as well as dyes, such as nigrosine and anthraquinones can be added as colorants. However, it is preferred if the molding composition according to the invention contains neither carbon black nor graphite, i.e. the molding composition according to the invention is preferably free of carbon black and graphite.

In a particularly preferred embodiment, the thermoplastic molding composition according to the invention comprises:

(A) 34 to 82.9% by weight of a mixture of at least one polyamide (A1), at least one polyphenylene ether (A2) and a compatibilizer (A3);

(B) 15 to 55% by weight of glass fiber, the glass composition of which comprises 12 to 24% by weight of boron oxide and 2 to 14% by weight for the sum of magnesium oxide and calcium oxide;

(C) 2 to 6 by weight LDS additive selected from the group consisting of copper chromium oxide, copper tungstate, copper oxide, copper hydroxide phosphate, tin hydroxide phosphate, tin phosphate, copper phosphate, basic copper phosphates and tin phosphates, or mixtures thereof, preferably selected as copper tungstate;

(D) 0.1 to 5% by weight of additives other than (A), (B) and (C);

the mixture (A) consisting of 52 to 89.8% by weight of component (A2), 10 to 45% by weight of component (A1), 0.2 to 3% by weight of component (A3), in each case based on the sum of components (A1) to (A3), the sum of components (A1) to (A3) giving 100% by weight of the mixture (A) and the sum of components (A) to (D) giving 100% by weight of the molding composition.

The molding compounds according to the invention have good mechanical properties, can be readily metallized after irradiation and are characterized by a low relative permittivity of less than 3.0 and a low dielectric loss factor of less than 0.008.

A preferred variant of the production of the molding composition according to the invention is that in a first step the mixture comprising components (A1) to (A4) is provided. For this purpose, components (A2), (A3) and optionally (A4) can first be metered into the feed section of an extruder and mixed at a temperature in the range from 220 to 340° C. The mixture is then fed into a side feeder. By means of a side feeder, component (A1) can then be introduced into the melt mixture formed from components (A2), (A3) and optionally (A4) in a housing of the extruder downstream of the feed. Alternatively, components (A1) to (A4) can also be metered into the feeder of an extruder and mixed in the extruder at a temperature of 220 to 340° C. In both variants, components (C) and/or (D) can additionally be included, with these components preferably being metered into the feed. In a second extrusion step, mixture (A) and components (C) and (D) or the mixture of (A), (C)

and (D) can then be metered into the feed of the extruder and melted at a temperature of 220-340° C., while component (B) is then fed via a side feeder into a housing of the extruder downstream of the feed and mixed with the melt present.

Another preferred method of producing the molding compound is to meter components (A1) to (A4), (C) and (D) into the feed of an extruder and melt and mix them in a first extruder section at a temperature of 220 to 340° C., before component (B) is then introduced into the melt via a side feeder and mixed with the other components in a second extruder section. The molding compound is then discharged and granulated after cooling. Underwater pelletizing is preferred for high filler contents.

Furthermore, the invention comprises a molded article which contains the above-described thermoplastic molding composition according to the invention or which preferably consists of this molding composition.

This molded body is preferably components, housings or housing parts of devices communicating with electromagnetic waves having a frequency of 0.3 to 300 GHz.

In particular, the moldings are selected from the group consisting of components, housings or housing parts of transmitting and receiving devices, cell phones, tablets, laptops, navigation devices, surveillance cameras, photo cameras, sensors, diving computers, audio systems, remote controls, loudspeakers, headphones, radio sets, television sets, household appliances, kitchen appliances, door or gate openers, operating devices for central locking in vehicles, keyless-go vehicle keys, temperature-measuring or temperature-indicating devices, measuring devices and control devices.

MEANS OF CARRYING OUT THE INVENTION

Measurement Methods

The following measurement methods were used within the scope of this application:
Relative Viscosity Relative viscosity was determined according to ISO 307 (2007) at 20° C. For this purpose, 0.5 g of polymer granules were weighed into 100 ml of m-cresol. The relative viscosity (RV) was calculated according to RV=t/t0 following section 11 of the standard.
Glass Transition Temperature (Tg) and Melting Point (Tm)

The determination of the glass transition temperature and melting point was carried out on granules according to ISO 11357-2 and -3 (2013). Differential Scanning calorimetry (DSC) was performed at a heating rate of 20 K/min for each of the three heatings. After the first heating, the sample was cooled at a rate of 20 K/min and the melting point was determined during the subsequent heating (second heating). The sample was then quenched in dry ice and the glass transition temperature (Tg) was determined during the third heating. The temperature at the peak maximum was taken as the melting point. The midpoint of the glass transition region, which was given as the glass transition temperature (Tg), was determined by the "half height" method.
Tensile Modulus Tensile modulus was determined according to ISO 527 (2012) at 23° C. with a tensile speed of 1 mm/min on an ISO tensile bar (type A1, mass 170×20/10×4) manufactured according to the standard: ISO/CD 3167 (2003).
Stress at Break and Elongation at Break Determination of tensile stress at break and elongation at break were performed according to ISO 527 (2012) at 23° C. with a tensile speed of 5 mm/min for reinforced materials on an ISO tensile bar, type A1 (mass 170×20/10×4 mm), manufactured according to the standard: ISO/CD 3167 (2003).
Relative Permittivity and Dielectric Loss Factor (DLF)

The measurement of relative permittivity εr and dielectric loss factor (DLF) is performed according to IEC 61189-2-721 (2015) on 80×80×3 mm plates with film gate using a split post dielectric resonator (SPDR) from QWED, Poland (brochure, including information on the measurement available at www.qwed.eu). The measurement frequency is 2.45 GHz, and the measurement temperature is 23° C.
Mold Shrinkage The plates (type D2, 60×60×2 mm, film gate) for the determination of mold shrinkage were manufactured according to ISO 294-3 (2002) and Amendment 1 (2006). The injection shrinkage was determined in accordance with ISO 294-4 (2001) after storage of the sheets for 14 days in a standard climate (23° C., 50% relative humidity) in relation to the cavity size, longitudinally and transversely to the direction of flow of the molding compound melt. The arithmetic mean of the measurements on 5 plates is given. The ratio of the injection shrinkage along and across the flow direction of the molding compound is also referred to as warpage or distortion.
Laser Structuring and Metallizability:

To evaluate the metallization behavior, injection molded parts (plate 60×60×2 mm) were structured using an Nd:YAG laser and subsequently metallized in an electroless copper plating bath. During laser structuring, 18 adjacent 10×10 mm areas were irradiated on the molded part surface. Laser structuring was carried out using a FOBA DP50 laser at a wavelength of 1064 nm and an irradiation width of approximately 50 μm at a speed of 4 m/s. Both the pulse frequency and the pulse width were adjusted. Both the pulse frequency and the current intensity of the laser were varied. For the specific pulse frequencies of 5, 6, 7 and 8 kHz, the diode current of the laser was set to 24.0, 24.5, 25.0 and 25.5 amperes, respectively. Following the laser structuring, the moldings were subjected to a cleaning process to remove the residues of the laser process. The moldings were successively subjected to ultrasonic baths with surfactant and deionized water. The cleaned moldings were then metallized in a reductive copper plating bath (MacDermid MID-Copper 100 B1) for 20-30 minutes.
Assessment of Metallization:
   o: in fewer than 14 areas, copper was deposited in an average thickness of at least 3 μm;
   +: in 14 or 15 areas copper was deposited in an average thickness of at least 3 μm;
   ++: in all 16 areas, copper was deposited in an average thickness of at least 3 μm;

Sufficiently metallized, for the purposes of the invention, means that in at least 14 areas copper is deposited in an average thickness of at least 3 μm.
Colorability:
   F: the molding compounds can be colored in other colors beyond black, such as yellow, orange, red or blue.
   S: the molding compounds are black and cannot be colored in other colors.
Glass Composition of the Glass Filler The glass composition of the glass filler, in particular the glass fibers, was determined using the following determination methods: Optical emission spectrometry with inductively coupled plasma (ICP OES) according to DIN 51086-2:2004, titrimetric determination of the content of boron oxide according to ISO 21078-1:2008, X-ray fluorescence melt decomposition method according to ISO 12677:2003, fluorine determination after pyrohydrolysis according to DIN 51084:2008.

Preparation of the Polyamide Molding Compounds

For the examples B1 to B9 according to the invention and for the comparative example VB4, the various compounds (A) were first prepared. For this purpose, according to Tables 2 and 3, the respective amount of polyphenylene ether (A2) and of compatibilizer (A3) was metered into the feed zone of a twin-screw extruder from Werner & Pfleiderer, type ZSK 25, and the polyamide component (A1) was introduced into the melt via a side feeder 6 barrel zones before discharge. The temperature of the first zone was set to 70° C., that of the remaining housings to 260 to 290° C. for the examples with polyamide-1 and to 290 to 320° C. for the examples with polyamide-2. A speed of 300 rpm and a rate of 10 kg/h were used and atmospheric degassing was applied. The strands were cooled in a water bath, cut, and the obtained granules were dried at 100° C. for 24 h in vacuum (30 mbar). Then the dried granules of blend (A), polyamides or polyphenylene ethers were mixed together with additives (C) and (D) to form a dryblend, in the proportions given in Tables 2 and 3. This mixture was homogenized by means of a tumbling mixer for about 20 minutes. The molding compounds were produced on a twin-screw extruder from Werner & Pfleiderer type ZSK 25 in the ratio given in Tables 2 and 3. The dryblend was metered into the feeder via a weigh feeder. The glass fibers (B) were metered via a weigh feeder into a side feeder, which fed the glass fibers (B) six housing units into the melt upstream of the die. The temperature of the first housing was set at 80° C., that of the remaining housings at 260 to 280° C. for examples B1 to B3, B7, B8, VB1 and VB2, and at 280 to 310° C. for examples B4 to B6, B9, VB3 and VB4. A speed of 250 rpm and a throughput of 15 kg/h were used and atmospheric degassing was applied. The strands were cooled in a water bath, cut, and the obtained granules were dried at 110° C. for 24 h in vacuum (30 mbar) to a water content below 0.1 wt %.

Production of the Test Specimens

The test specimens were produced on an injection molding machine from Arburg, model Allrounder 420 C 1000-250. Ascending cylinder temperatures of 260° C. to 280° C. and a mold temperature of 80° C. were used for examples B1-B3, B7, B8, VB1 and VB2, and cylinder temperatures of 290 to 320° C. and a mold temperature of 120° C. were used for examples B4-B6, B9, VB3 and VB4. Unless otherwise specified, the test specimens were used in dry condition; for this purpose, they were stored for at least 48 h at room temperature in a dry environment, i.e. over silica gel, after injection molding.

TABLE 1

Materials used in the examples and comparative examples

| Component | Description | Manufacturer/Source |
|---|---|---|
| Polyamid-1 (Component A1) | Polyamide 12 from laurolactam, RV = 1.90, Tm = 178° C. | EMS-CHEMIE AG, Switzerland |
| Component-2 (Komponente A1) | Polyamide 10T/6T from 1,6-hexandiamine, 1,10-decandiamine and terephthalic acid RV = 1.78, Tm = 295° C. | EMS-CHEMIE AG, Switzerland |
| Polyphenylenether (Component A2) | IUPIACE PX100F, Poly(oxy-2,6-dimethyl-1,4-phenylene), CAS-No.: 25134-01-4; RV = 1.12 | Mitsubishi Engineering Plastics Corporation, Japan |
| MAH (Component A3) | Maleic anhydride, CAS-No.: 108-31-6 (Compatibilizer) | Lanxess, Germany |
| Glass fibers Type 1 (Component B, glass fibers according to the invention) | NITTOBO CNG3PA-820, flat glass fibers, length = 3 mm, primary cross-sectional axis: 28 µm, secondary cross-sectional axis 7 µm, aspect ratio of cross-sectional axes: 4, Glass composition: Mg-oxide + Ca-oxide = 8.3 %, Boron oxide = 19.4%, RP = 4.8, DLF = 0.0015 | Nitto Boselci Co., LTD., Japan |
| Glass fibers Type 2 (glass fibers not according to the invention) | NITTOBO CSG3PA-820, flat glass fibers, length = 3 mm, primary cross-sectional axis 28 mm, secondary cross-sectional axis 7 mm, aspect ratio of cross-sectional axes = 4, Glass-composition: Mg-oxide + Ca-oxide = 23.6 %, Boron oxides = 6.1-%, RP = 6.8, DLF = 0.0035 | Nitto Boselci Co., LTD., Japan |
| LDS-1 (Component C) | SHEPHERD BLACK 30C965, copper chromite (CuCr2O4) with average particle size D50 = 0.6 µm | The Shepherd Color Company, USA |
| LDS-2 (Component C) | SHEPHERD EX1815, CAS-No. 13587-35-4 Copper tungstate (CuWO4) with average particle size D50 = 1.1 µm | The Shepherd Color Company, USA |
| Stabilizer (Component D) | Mixture of: D1: HOSTANOX O 3 P, Bis [3,3-bis-(4'hydroxy-3'-tert-butyl-phenyl) butyric acid glycol ester, CAS-Nr.: 32509-66-3 D2: SANDOSTAB P-EPQ, Tetrakis (2,4-di-tert-butylphenyl)-4,4'-biphenyldiphosphonite, CAS-Nr. 119345-01-6 D3: HOSTAVIN N 30 P, HALS (Hindered Amine Light Stabilizer), CAS-Nr.: [202483-55-4 In ratio 4:1:2 (D1:D2:D3) | Clariant Produkte AG, Switzerland |
| Processing aid (Component D) | Magnesium stearate AV | Baerlocher GmbH, Deutschland |

RP: Relative permittivity;
DLF: Dielectric loss-factor

TABLE 2

| | Unit | B1 | B2 | B3 | B4 | B5 | B6 | B7 |
|---|---|---|---|---|---|---|---|---|
| Mixture (A) | Wt. %[1] | 75.1 | 75.1 | 75.1 | 75.1 | 75.1 | 75.1 | 65.1 |
| Polyamide-1 (A1) | Wt. %[2] | 10 | 30 | 45 | | | | 30 |
| Polyamide-2 (A1) | Wt. %[2] | | | | 10 | 30 | 45 | |
| Polyphenylene ether (A2) | Wt. %[2] | 88 | 68 | 53 | 88 | 68 | 53 | 68 |
| MAH (A3) | Wt. %[2] | 2 | 2 | 2 | 2 | 2 | 2 | 2 |
| Glass fibers Type 1 (B) | Wt. %[1] | 20.0 | 20.0 | 20.0 | 20.0 | 20.0 | 20.0 | 30 |
| Glass fibers Type 2 | Wt. %[1] | | | | | | | |
| LDS-1 (C) | Wt. %[1] | 4.0 | 4.0 | 4.0 | 4.0 | 4.0 | 4.0 | 4.0 |
| Stabilizers (D) | Wt. %[1] | 0.7 | 0.7 | 0.7 | 0.7 | 0.7 | 0.7 | 0.7 |
| Lubricant (D) | Wt. %[1] | 0.2 | 0.2 | 0.2 | 0.2 | 0.2 | 0.2 | 0.2 |
| Tensile modulus | MPa | 5900 | 5720 | 5400 | 6220 | 6430 | 6440 | 6800 |
| Tensile stress at break | MPa | 78 | 83 | 87 | 101 | 94 | 101 | 89 |
| Elongation at break | % | 1.9 | 2.1 | 2.5 | 2.1 | 1.9 | 2.1 | 1.9 |
| Mold shrinkage, longitudinal | % | 0.64 | 0.71 | 0.57 | 0.48 | 0.56 | 0.534 | 0.28 |
| Mold shrinkage, transverse | % | 0.75 | 0.82 | 0.69 | 0.58 | 0.61 | 0.64 | 0.35 |
| Distortion[3] | — | 1.17 | 1.15 | 1.21 | 1.21 | 1.09 | 1.21 | 1.25 |
| Relative permittivity | — | 2.8 | 2.8 | 2.8 | 2.8 | 2.9 | 2.9 | 2.9 |
| DLF | — | 0.006 | 0.006 | 0.007 | 0.005 | 0.006 | 0.007 | 0.007 |
| Metallizability | | ++ | ++ | ++ | + | + | + | ++ |
| Colorability | | S | S | S | S | S | S | S |

[1] relative to the sum of the components (A) to (D)
[2] relative to the sum of the components (A1) to (A3); A4 = 0% by weight.
[3] distortion = ratio of injection shrinkage transverse to longitudinal

TABLE 3

| | Unit | B8 | B9 | VB1 | VB2 | VB3 | VB4 |
|---|---|---|---|---|---|---|---|
| Mixture (A) | Wt. %[1] | 75.1 | 75.1 | 75.1 | 75.1 | 75.1 | 75.1 |
| Polyamide-1 (A1) | Wt. %[2] | 30 | | 0 | 100 | 0 | |
| Polyamide-2 (A1) | Wt. %[2] | | 30 | 0 | 0 | 100 | 49 |
| Polyphenylene ether (A2) | Wt. %[2] | 68 | 68 | 100 | 0 | 0 | 49 |
| MAH (A3) | Wt. %[2] | 2 | 2 | 0 | 0 | 0 | 2 |
| Glass fibers Type 1 (B) | Wt. %[1] | 20.0 | 20.0 | 20.0 | 20.0 | 20.0 | |
| Glass fibers Type 2 | Wt. %[1] | | | | | | 20.0 |
| LDS-1 (C) | Wt. %[1] | | | 4.0 | 4.0 | 4.0 | 4.0 |
| LDS-2 (C) | Wt. %[1] | 4.0 | 4.0 | | | | |
| Stabilizers (D) | Wt. %[1] | 0.7 | 0.7 | 0.7 | 0.7 | 0.7 | 0.7 |
| Lubricant (D) | Wt. %[1] | 0.2 | 0.2 | 0.2 | 0.2 | 0.2 | 0.2 |
| Tensile modulus | MPa | 5860 | 6430 | 5900 | 5400 | 6500 | 6440 |
| Tensile stress at break | MPa | 86 | 101 | 96 | 89 | 110 | 101 |
| Elongation at break | % | 1.9 | 2.0 | 2.3 | 4.8 | 2.9 | 2.1 |
| Mold shrinkage, longitudinal | % | 0.59 | 0.66 | 0.50 | 0.58 | 0.65 | 0.534 |
| Mold shrinkage, transverse | % | 0.7 | 0.79 | 0.82 | 0.66 | 0.75 | 0.64 |
| Distortion[3] | % | 1.19 | 1.20 | 1.64 | 1.14 | 1.15 | 1.21 |
| Relative permittivity | — | 2.8 | 2.8 | 2.8 | 3.0 | 3.1 | 3.1 |
| DLF | — | 0.007 | 0.007 | 0.004 | 0.013 | 0.012 | 0.009 |
| Metallizability | | ++ | + | o | + | + | + |
| Colorability | | F | F | S | S | S | S |

[1] bezogen auf die Summe der Komponenten (A) bis (D)
[2] bezogen auf die Summe der Komponenten (A1) bis (A3)
[3] Distortion = ratio of injection shrinkage transverse to longitudinal

The invention claimed is:
1. A thermoplastic molding composition consisting of:
(A) mixture of at least one polyamide (A1) selected as an aliphatic polyamide from the group consisting of PA610, PA612, PA12, PA616 and mixtures thereof, at least one polyphenylene ether (A2), a compatibilizer (A3) or as a mixture of a compatibilizer and a free radical initiator; whereby the compatibilizer is selected from the group consisting of maleic acid, maleic anhydride, fumaric acid, acrylic acid, methacrylic acid, methylmaleic acid, methylmaleic anhydride, itaconic acid, itaconic anhydride, butenylsuccinic acid, butenylsuccinic anhydride, tetrahydrophthalic acid, tetrahydrophthalic anhydride N-phenylmaleimide, malic acid and 2-hydroxynonadecane-1,2,3-tricarboxylic acid, the mono- or diesters of the acids mentioned with C1- to C12-alcohols such as methanol or ethanol, the mono- or diamides of the acids mentioned, which may be substituted on the nitrogen with alkyl or aryl radicals having up to 12 carbon atoms, the salts with alkali or alkaline earth metals such as calcium and potassium and mixtures thereof; and whereby the radical initiator is selected from the group consisting of 1,1-di-tert-butyl-peroxy-3,3,5-trimethylcyclohexane, tert-butyl-peroxy-isopropyl-carbonate, tert-butyl-peroxy-3,3,5-trimethylhexoate, tert-butyl-peracetate, tert-butyl perbenzoate, 4,4-di-tert-butyl peroxy-valeric acid n-butyl ester, 2,2-di-tert-butyl peroxy-butane, dicumyl peroxide, tert-butyl cumyl peroxide, 1,3-bis(tert-butyl peroxyisopropyl) benzene, di-tert-butyl peroxide and mixtures thereof; and optionally an olefinic and/or vinylaromatic polymer (A4);

(B) 10 to 60% by weight of glass filler, selected as glass fibers having a non-circular cross-section and an axis ratio of major to minor cross-sectional axis in the range of from 3 to 5 the glass composition of which comprises 52.0 to 57.0% by weight of silica, 13.0 to 17.0% by weight of aluminum oxide, 15.0 to 21.5% by weight of boron oxide, 2.0 to 6.0% by weight of magnesium oxide, 2.0 to 6.0% by weight of calcium oxide, 1.0 to 4.0% by weight of titanium dioxide, 0 to 1.5% by weight of fluorine, 0 to 0.6% by weight of alkali oxides;

(C) 1 to 8% by weight of an LDS additive as copper tungstate;

(D) 0 to 5% by weight of additives other than components (A), (B) and (C);

wherein 80 to 100% by weight of mixture (A) consists of a mixture (M) of components (A1), (A2) and (A3) and 0 to 20% by weight of component (A4), each based on the sum of components (M) and (A4), and wherein the sum of components (M) and (A4) gives 100% by weight of mixture (A);

and where the mixture (M) consists of from 36 to 92% by weight of component (A2), from 8 to 60% by weight of component (A1) and from 0 to 4% by weight of component (A3), in each case based on the sum of components (A1) to (A3), and where the sum of components (A1) to (A3) gives 100% by weight of the mixture (M); and the sum of components (A) to (D) being 100% by weight of the molding composition.

2. A thermoplastic molding composition according to claim 1, wherein component (A1) is present in the mixture (M) in a proportion of from 10 to 48% by weight, based on the sum of components (A1) to (A3) and component (A2) is present in the mixture (M) in a proportion of from 48 to 89.9 percent by weight, based on the sum (A1) to (A3); and component (A3) is present in the mixture (M) in a proportion of from 0.1 to 4% by weight, based on the sum (A1) to (A3); and/or the mixture (A) consists exclusively of components (A1) to (A3).

3. A thermoplastic molding composition according to claim 1, characterized in that the at least one polyphenylene ether of component (A2) is selected from the group consisting of poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4- phenylene) ether, poly(2-ethyl-6-propyl-1,4-phenylene) ether or copolymers or mixtures thereof.

4. A thermoplastic molding composition according to claim 1, characterized in that the olefinic and/or vinylaromatic polymers (A4) are selected from the group consisting of: styrene-ethylene-butylene-styrene block copolymers, styrene-ethylene-propylene-styrene block copolymers, styrene-butadiene-styrene block copolymers, styrene-styrene-butadiene-styrene block copolymers, polyethylene, polypropylene, polybutadiene, poly-4-methylpentene, ethylene-propylene copolymers, ethylene-butene copolymer, ethylene-methylhexadiene copolymers, propylene-methylhexadiene copolymers, ethylene-octene copolymer, ethylene-propylene-butene copolymers, ethylene-propylene-hexene copolymers, ethylene-propylene-methylhexadiene copolymers, poly(ethylene-vinyl acetate), ethylene-ethyl acrylate copolymer, ethylene-hexene copolymer, ethylene-propylene-diene terpolymers, and mixtures of these polymer materials; and/or are grafted with carboxylic acid or carboxylic acid anhydride groups; and/or are grafted with acrylic acid, methacrylic acid or maleic anhydride, the degree of grafting being 0.1 to 4.0, preferably 0.4 to 2.5 by weight, based on the grafted polymer (A4).

5. A thermoplastic molding composition according to claim 1, characterized in that the additives of components (D) are selected from the group consisting of stabilizers, anti-aging agents, antioxidants, antiozonants, processing stabilizers, processing aids, viscosity modifier, light stabilizers, UV stabilizers, UV absorbers, inorganic heat stabilizers including those based on copper halides and alkali halides, organic heat stabilizers, optical brighteners, crystallization accelerators, crystallization retarders, flow aids, lubricants, slip agents, mold release agents, coloring agents including those comprising dyes, inorganic pigments, organic pigments, marking agents and mixtures thereof.

6. A thermoplastic molding composition according claim 1, characterized in that the proportion of component (A) is present in a range from 34 to 82.9% by weight, based on the sum of components (A) to (D); and/or component (B) is present in a range from 15 to 55% by weight, based on the sum of components (A) to (D); and/or component (C) is present in the range from 2 to 6% by weight, based on the sum of components (A) to (D) and/or component (D) is present in the range from 0.1 to 5% by weight, based on the sum of components (A) to (D).

7. A molded article comprising a molding composition according claim 1.

8. A molded article according to claim 7, characterized in that the molded article is selected from components, housings or housing parts of devices communicating with electromagnetic waves having a frequency of 0.3 to 300 GHz.

9. A molded article according to claim 8, characterized in that the article is selected from the group consisting of components, housings or housing parts of transmitting and receiving devices, cell phones, tablets, laptops, navigation devices, surveillance cameras, photo cameras, sensors, diving computers, audio systems, remote controls, loudspeakers, headphones, radio sets, television sets, household appliances, kitchen appliances, door or gate openers, operating devices for the central locking system in vehicles, keyless-go vehicle keys, temperature measuring or temperature indicating devices, measuring devices and control devices.

* * * * *